D. S. JACOBUS.
METHOD OF AND APPARATUS FOR REGULATING THE TEMPERATURE OF SUPERHEATED STEAM.
APPLICATION FILED MAY 24, 1909.

1,149,265.

Patented Aug. 10, 1915.

WITNESSES:

INVENTOR
DAVID S. JACOBUS
BY
HIS ATTORNEYS

D. S. JACOBUS.
METHOD OF AND APPARATUS FOR REGULATING THE TEMPERATURE OF SUPERHEATED STEAM.
APPLICATION FILED MAY 24, 1909.

1,149,265.

Patented Aug. 10, 1915.

INVENTOR
DAVID S. JACOBUS

D. S. JACOBUS.
METHOD OF AND APPARATUS FOR REGULATING THE TEMPERATURE OF SUPERHEATED STEAM.
APPLICATION FILED MAY 24, 1909.

1,149,265.

Patented Aug. 10, 1915.

WITNESSES:

INVENTOR
DAVID S. JACOBUS
BY
HIS ATTORNEYS

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

METHOD OF AND APPARATUS FOR REGULATING THE TEMPERATURE OF SUPERHEATED STEAM.

1,149,265.　　　Specification of Letters Patent.　Patented Aug. 10, 1915.

Application filed May 24, 1909. Serial No. 498,012.

*To all whom it may concern:*

Be it known that I, DAVID S. JACOBUS, a citizen of the United States, residing at Jersey City, in the county of Hudson and State of New Jersey, have invented certain new and useful Improvements in Methods of and Apparatus for Regulating the Temperature of Superheated Steam, of which the following is a specification.

The successful development of the steam turbine, and of reciprocating engines adapted to the use of superheated steam, has directed attention to methods of overcoming the troubles resulting from the excess of superheat. For the steam turbine the degree of superheat is seldom less than 100° F., and is usually higher, while the maximum superheat which may be used has yet to be determined. In a reciprocating engine the superheat which may be used to advantage is limited by the design of the working parts, and any considerable increase augments the difficulty of lubrication, and may cause trouble with the packings and the cracking of the cylinder. Owing to the presence of variables, such as furnace conditions and rate of flow of steam through the superheater, it is impossible to maintain a substantially constant temperature of the superheated steam.

The object of the present invention is to establish and maintain a practically constant temperature in superheated steam, where so desired, or a temperature which may be made to vary to meet certain conditions of service. This object of reducing the amount of fluctuation in the temperature of superheated steam to a degree which will prevent any danger from an excess of superheat, is accomplished by placing in the path of the steam a thermostat which may be in the form of a closed vessel, which I have termed an evaporator, containing air or other gas, a volatile liquid, or a liquid which is not volatile at the temperature involved, or one depending upon unequal expansion of different metals, and utilizing the pressure generated in the evaporator by the heat of the superheated steam, or the expansion or contraction of the metals, to control the temperature of the steam.

According to the preferred method of practising my invention, I employ an evaporator containing a volatile liquid such as water, alcohol or mercury, which may be placed in the path of the steam after its temperature has been reduced to a substantially constant figure whereby the governing action is secured by means of minute differences in the temperature of the steam which create correspondingly small differences of pressure in the evaporator. The principle involved is based upon the well-known physical fact that in evaporating a volatile liquid there is a certain definite pressure corresponding to a given temperature. From this it follows that if the temperature of a volatile liquid in an evaporator is maintained at a certain fixed amount, the pressure of the vapor produced in the evaporator will remain constant.

In practising my preferred method I first modify the temperature of superheated steam of a varying initial temperature by subjecting it to the action of a cooling or heating medium so as to bring the steam temperature to a predetermined constant figure, and after its temperature has been so modified causing the steam to come into contact with an evaporator containing a volatile liquid, the temperature of such liquid, and conseqeuntly the pressure of its vapor, remaining practically constant as long as the temperature of the steam remains constant. Should, however, there be any variation of the temperature of the superheated steam in contact with the evaporator, such variation will produce a corresponding variation in the temperature of the volatile liquid and the pressure of its vapor, and this pressure is utilized by me to control the temperature of the steam.

The primary means of control, therefore, in practising my preferred method, consists of a closed evaporator containing a volatile liquid which is acted on by the steam in such manner that the pressure generated by the volatile liquid may be used to control or regulate the temperature of the superheated steam.

In the accompanying drawings

Similar reference numerals indicate similar parts in the several views.

As above stated, I prefer to use an evaporator containing a volatile liquid to control the temperature of the superheated steam and I will first describe the various forms of apparatus in which such evaporator may be used.

Figure 1:
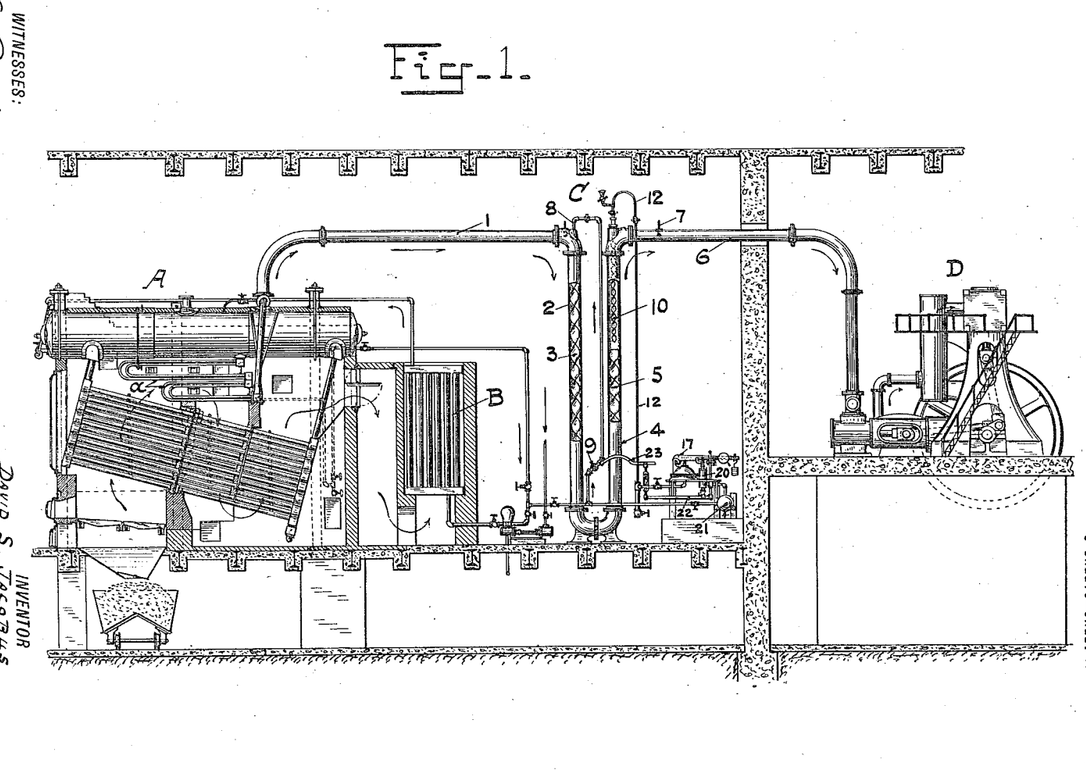
Figure 1 is an elevation partly in section of a boiler and engine plant containing apparatus for practising my invention and showing its location with respect to the boiler and engine.

In Fig. 1 I have shown a boiler and engine plant for the purpose of illustrating the adaptation thereto of apparatus for maintaining the temperature of the superheated steam delivered to the engine practically constant, and the relative location of my controller to the boiler. The plant comprises a boiler A having a superheater a; a feed water heater or economizer B, a controller C for regulating the temperature of the superheated steam and an engine D adapted to utilize the steam. Although I have shown the controller connected to a single boiler, it is to be understood that it may be connected to a bank of boilers and that the steam from the controller may be conveyed to more than one engine.

I will first describe the form of controller shown in Figs. 1 to 10 and its mode of operation. In this form the numeral 1 indicates a pipe conveying superheated steam of a varying initial temperature from the superheater a to the controller. The latter comprises two vertical sections connected together at their lower ends. The first section, which I have called an attemperator, consists of a pipe 2 of suitable length in which is placed a band of sheet metal 3 twisted throughout its length so as to cause the superheated steam, while passing through the pipe 2, to take a spiral path. In the lower part of the second section 4, which is also of pipe, is a spirally twisted band 5 similar to the band 3. Connected to the upper part of section 4 is a steam outlet pipe 6 having at any convenient point therein a thermometer 7. Opening into the upper part of the attemperator is a water supply pipe 8 having a cock 9 by which the volume of water admitted to the attemperator may be controlled. On starting the apparatus, as more fully described hereafter, the valve or cock 9 is opened to admit sufficient water to reduce the degree of superheat to the predetermined constant, and this constant is maintained by the following means.

Figures 3, 4, 5, 6, 7, 8:
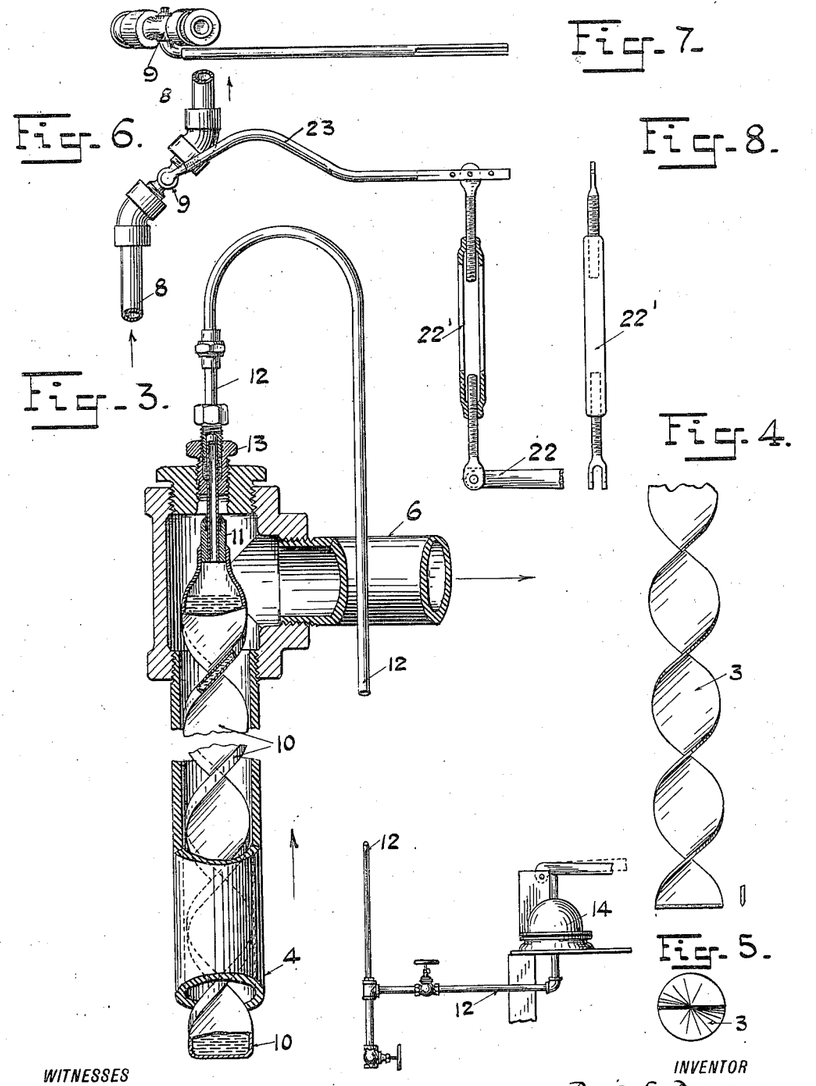
Figs. 3 to 8, inclusive, are enlarged detail views of parts of Fig. 2.

In the upper part of the section 4 of the controller is an evaporator 10 closed to the steam and containing a volatile liquid such as water, alcohol or mercury, having a fixed boiling point for a given pressure. This evaporator 10 may be given any appropriate form which will insure a relatively large heating surface, and a small internal volume. I have used a flattened sheet metal tube spirally twisted which gives the desired surface and at the same time spreads out the contained liquid, or causes it to come in contact with a large surface which aids or facilitates its evaporation and renders such liquid extremely sensitive to variations in the temperature of the surrounding steam. As shown, the evaporator is closed at its upper end by welding in a plug 11 adapted to receive one end of a pipe 12. The latter passes through a stuffing box seated in a bushing 13 screwed into the T between the controller section 4 and the steam outlet pipe 6 (Fig. 3). The pipe 12 leads to a regulator or governor of the Carmichael or Spencer type, such as is often used for regulating dampers in connection with boilers.

Figures 9, 10:
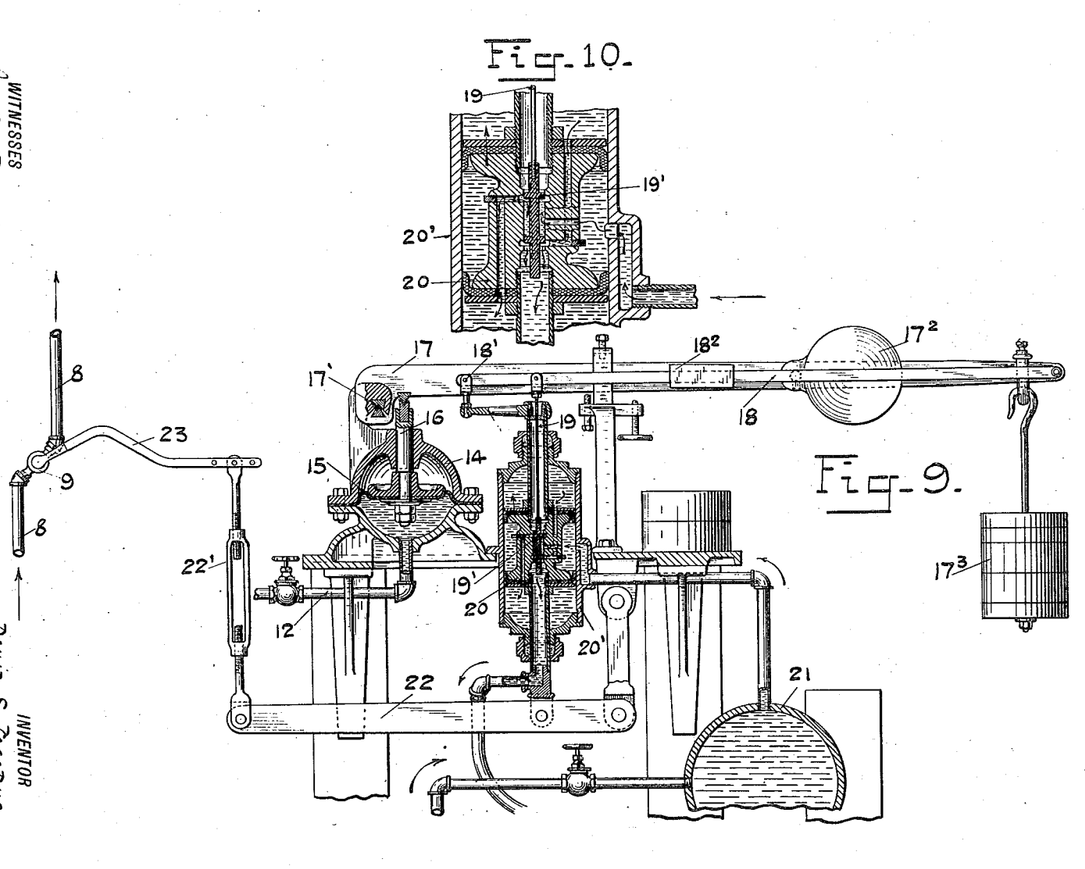
Figs. 9 and 10 are enlarged detail views of the damper regulator of Fig. 2.

The regulator or governor, shown in detail in Figs. 9 and 10, comprises a chamber 14 having a flexible diaphraghm 15 which receives at its under side through pipe 12 the pressure generated in the evaporator. Secured to the diaphragm is a stem 16 which projects through chamber 14 and bears against a lever 17 having its fulcrum at 17'. To the outer end of lever 17 is fixed an auxiliary lever 18, fulcrumed at 18', and having a connecting rod 19 to a pilot valve 19'. The force acting on the under side of the diaphragm 15 is opposed by the adjustable weight $17^2$ and the removable weights $17^3$ on lever 17, and the adjustable weight $18^2$ on lever 18. By means of this system of levers the pilot valve is made to operate a piston 20 in cylinder 20' by water pressure. When the pressure generated in the evaporator increases the levers 17 and 18 are raised, thus admitting water from the high pressure reservoir 21 to the under side of the piston, and to the upper side of the piston when the vapor pressure decreases. To the piston is connected a power lever 22, the free end of the latter being connected through turn-buckle 22' to a lever 23 which actuates the plug of the cock 9 inserted in the water supply pipe 8.

The forces operating the pilot valve are those corresponding to the slight differences in pressure which are produced in the evaporator by the slight temperature variations in the steam surrounding the evaporator, and it is highly essential that the movement of the pilot valve be as free as possible. The piston which is operated by the water pressure provides an amount of force for moving the power lever 22 which is limited only by the size of the piston and the water pressure, so that the pilot valve which is operated by a comparatively minute force may call into play any amount of force required to operate the power lever. It is necessary that the power and range of motion shall be such that the lever 23 may either completely close the cock 9 or open it the required amount.

The action of the apparatus as a whole is to cause the pressure generated by the liquid on being evaporated in the evaporator 10 to act through the regulator in such manner that when there is any excess in the outgoing steam temperature, the variation in the pressure will cause the power lever 22 to rise and actuate the cock 9 so as to admit an additional quantity of water to the attemperator through the pipe 8 and thus reduce the temperature of the steam passing through the attemperator 2 to the predetermined normal or constant figure. On the other hand, should the temperature of the outgoing steam fall below the normal or constant figure the pressure of the evaporated liquid in the evaporator 10 will fall below the set figure and the machine will reduce the amount of water admitted to the attemperator through pipe 8 and thus prevent any lowering of the temperature below that at which the apparatus is set.

Before starting up the apparatus the turnbuckle 22' is adjusted so that the cock 9 will be fully open when the lever 22 is in its uppermost working position and closed when it is in its lowermost working position. After this the turn-buckle 22' does not require further adjustment.

In starting up the apparatus the weights $17^2$, $17^3$, and $18^2$ are so adjusted that the pressure produced by the evaporation of the volatile liquid in the evaporator for the given constant temperature of superheat required will act on the diaphragm 15 to maintain the cock 9 in a position which will give the proper quantity of water to reduce the temperature of the steam to the required figure. After this the apparatus will automatically maintain the temperature at a substantially constant figure. In doing this the apparatus is governed by any slight change in the temperature of the steam leaving the attemperator. Should the steam temperature exceed the set figure, there will be a corresponding increase of pressure in the evaporator 10 which, acting on the diaphragm 15, will actuate the system of levers before described so as to open the cock 9 and permit a greater amount of water, according to the excess steam temperature, to flow through pipe 8 into the attemperator and thus reduce the temperature to substantially that of the set figure.

The water entering the attemperator 2 through the pipe 8 is made to mingle with the steam by the internal band 3 which is so formed as to cause its edges to assume a helical shape, and which rotates the steam and water passing through the attemperator so as to thoroughly sweep the surfaces and at the same time produce eddies which lead to a thorough mixture of the water with the superheated steam, the water, in fact, being vaporized and, according to the amount admitted and the latent heat imparted to the water together with the effect of the temperature of the water, reducing the temperature of the steam the desired amount. As the temperature of the steam entering the apparatus is lowered the pressure in the evaporator decreases thus partly or wholly closing cock 9.

It will thus be seen that any variation in the temperature of the superheated steam which passes the attemperator will increase or decrease the pressure in the evaporator, which in turn acts on the regulator to open or close cock 9 so as to control the amount of water admitted to the attemperator. In this way I have been able to preserve an approximately constant temperature of the outgoing superheated steam.

To give a concrete example, let it be assumed that the temperature of the superheated steam as it leaves the superheater $a$ varies between 500° and 550° F. and that it is desired to deliver the steam to engine D at a substantially constant temperature of 500° F. which for 200 pounds steam pressure corresponds to 112° F. of superheat. The varying initial steam temperatures would produce corresponding varying vapor pressures in the evaporator 10 and consequently varying pressures on the diaphragm 15 if the water supply to the throttling cock 9 were shut off and the attemperator portion of the apparatus then thrown out of action. By turning on the water by the cock 9 and adjusting the weights $17^2$, $17^3$, and $18^2$ the system of levers described will automatically adjust the cock 9 so that the volume of water admitted to the attemperator through pipe 8 will be sufficient to reduce the degree of superheat to the predetermined amount which may be observed by thermometer 7. After such adjustment any slight increase in the temperature of the steam surrounding the evaporator will cause a corresponding increase of vapor pressure in the evaporator and a movement of the power lever 22 to effect a further opening of cock 9 and the admission of a sufficiently greater volume of water to the attemperator to restore the steam temperature to that of the constant.

If, instead of reducing the temperature of the superheated steam to the lowest degree furnished by the superheater or a still lower amount, it is desired to limit the highest temperature that the steam attains on reaching the engine, this may be done by a proper adjustment of the weights. If in the above example the weights $17^2$, $17^3$ and $18^2$ are adjusted for a temperature of 525° F. then the steam supplied to the engine would vary in temperature from 500° to 525° F. but would never exceed the latter figure. For any temperature below 525° F. the cock 9 will be completely closed, and it would open to admit water to the attemperator only when the temperature is in excess of 525° F.

Instead of using water through pipe 8 I may use saturated steam to effect the desired reduction in temperature, the amount being controlled by operating the cock 9 or by opening and closing a special valve in the manner above described. Also, instead of employing water as a supplemental source of energy to operate the piston 20 to move the power lever 22, steam, air or any other fluid may be used.

Figure 11:
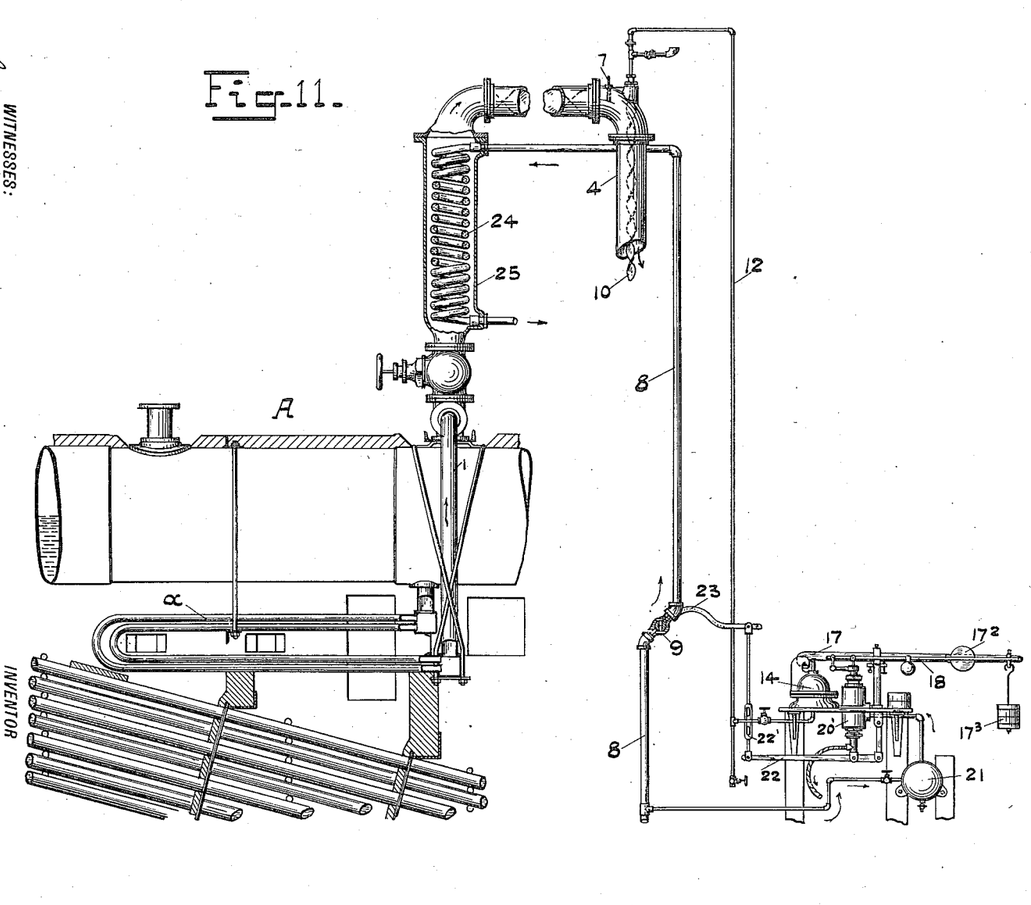
Figs. 11, 12, and 13, are elevations, partly in section, of modified forms of apparatus for practising my invention.

The apparatus above described illustrates one means for practising the preferred form of my invention, the principle of which is the conversion of the temperature of superheated steam into pressure generated by a volatile liquid on being evaporated, and the employment of such pressure to regulate or control the temperature of the superheated steam. This principle may be applied to an apparatus so constructed that the cooling water will circulate through coils instead of being injected into the superheated steam by means such as illustrated in Fig. 11, in which the water pipe 8, instead of terminating in the upper part of the attemperator, is formed into a coil 24 inclosed in a chamber 25 through which the steam from superheater $a$ is conveyed. The volume of water passing through coil 24 is controlled by cock 9 in the manner before described, that is to say, when the steam temperature surrounding the evaporator 10 varies from the predetermined constant or set figure the volume of water admitted to the coil is correspondingly varied through the movements of cock 9, which latter may be so adjusted as to be completely closed or opened to a greater or less extent to meet the requirements as to the degree of superheat. Instead of using cold water through pipe 8 and coil 24, I may use oil or other heating medium heated to a temperature above that of the superheated steam, the object in such case being to raise the temperature of the steam when it falls below a predetermined degree of superheat. To effect this the adjustment of cock 9 will be made to correspond with a variation of steam temperature to admit a sufficient volume of oil or other heating medium to coil 24 to raise the steam temperature to the degree desired, whether that be the highest degree of superheat as the steam leaves the superheater $a$, or any degree between the limits of variation which may be determined upon as the desired constant.

Figure 12:
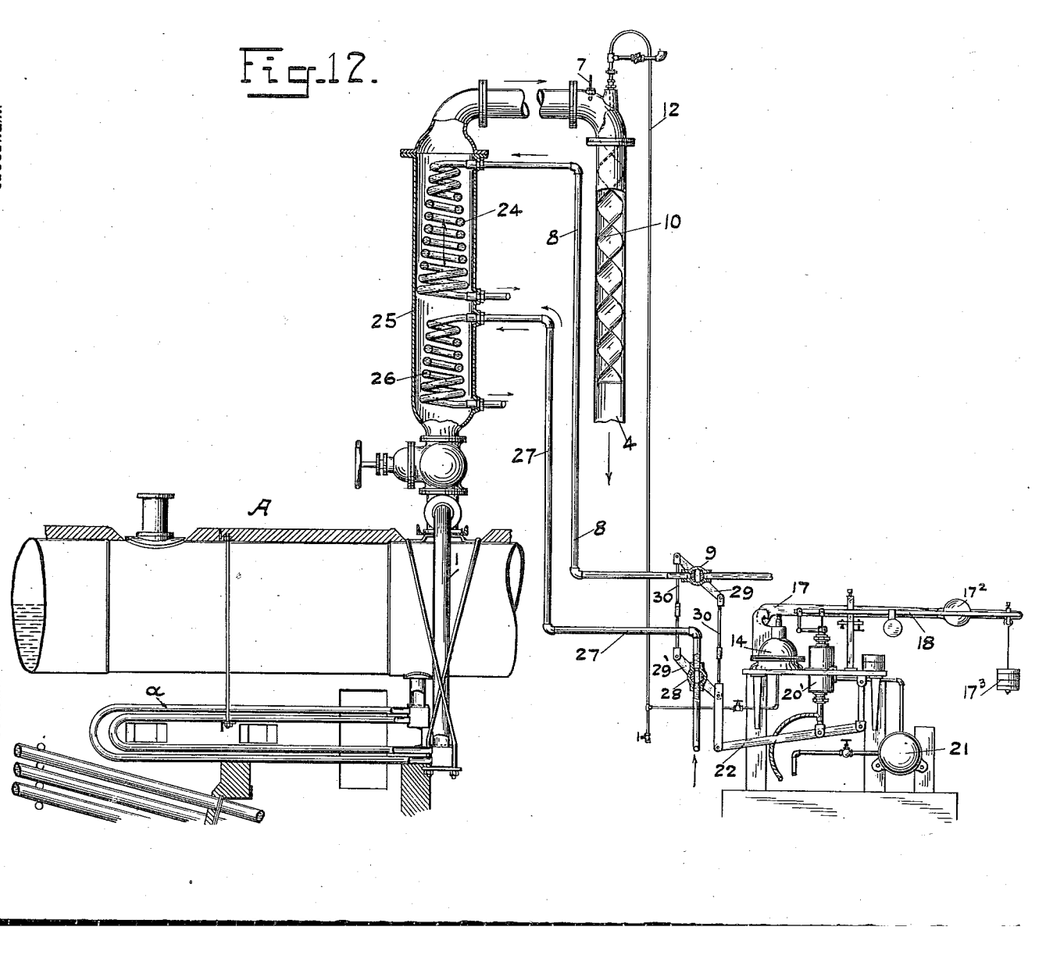

In Fig. 12 I have shown another adaptation of my invention which makes use of either a cold or a hot medium, or both, to establish and maintain the desired degree of superheat. In this form the coil 24 is connected to a cold water supply pipe 8. In addition thereto I introduce into the pipe or chamber 25 a second coil connected to a pipe 27 through which oil or some other medium heated to a temperature above that of the superheated steam or above any constant which it is desired to maintain, is conveyed. In the latter pipe is a cock 28. The parallel levers 29 and 29' connected respectively to the plugs of the cocks 9 and 28 are connected together by the rods 30, one of which is connected to the power lever 22. The cocks are so adjusted that the movement of lever 22 will effect the opening of one as the other closes. By this means, if the predetermined constant is within the limits of initial variation of the steam temperature the cock 9 will be opened to admit cold water to coil 24 to reduce the temperature to the constant, and cock 28 will be opened to admit hot oil or other heating medium to coil 26 to raise the temperature when it falls below the constant. The movement of lever 22 is effected by the same means heretofore described through variations of pressure generated in the evaporator 10 by any variation of the steam temperature surrounding the evaporator. By adjusting the weights on the levers 17 and 18 the initial adjustment of the cocks 9 and 28 is effected, this adjustment being varied only as the steam temperature surrounding the evaporator varies.

Figure 2:
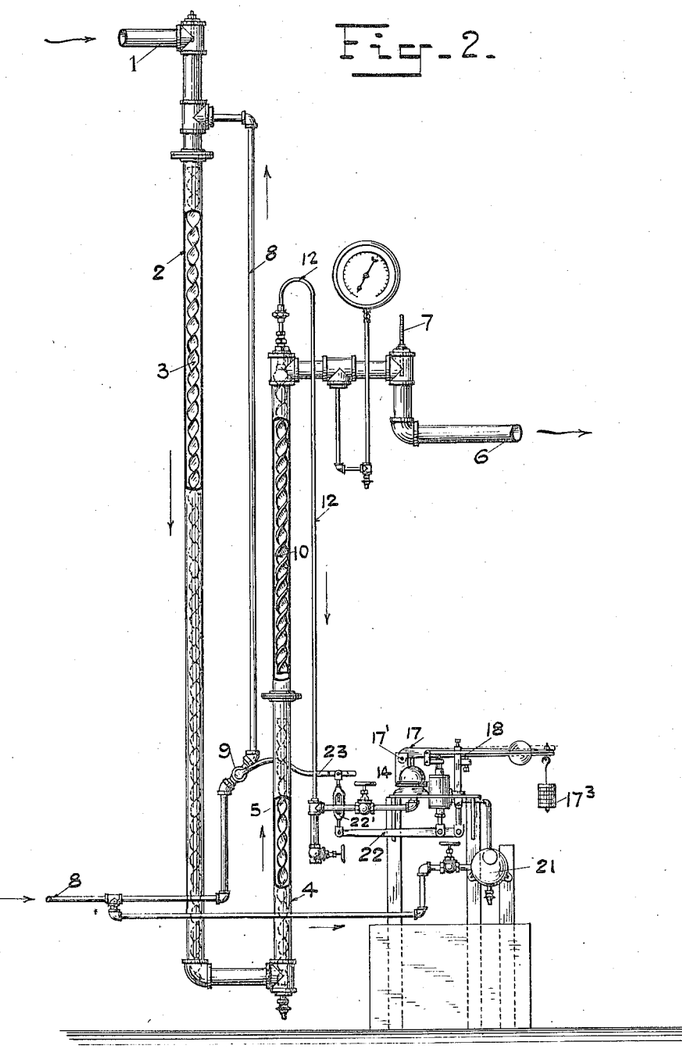
Fig. 2 is an elevation partly in section of an attemperator and evaporator showing their connection with each other and with a damper regulator.
Figure 13:
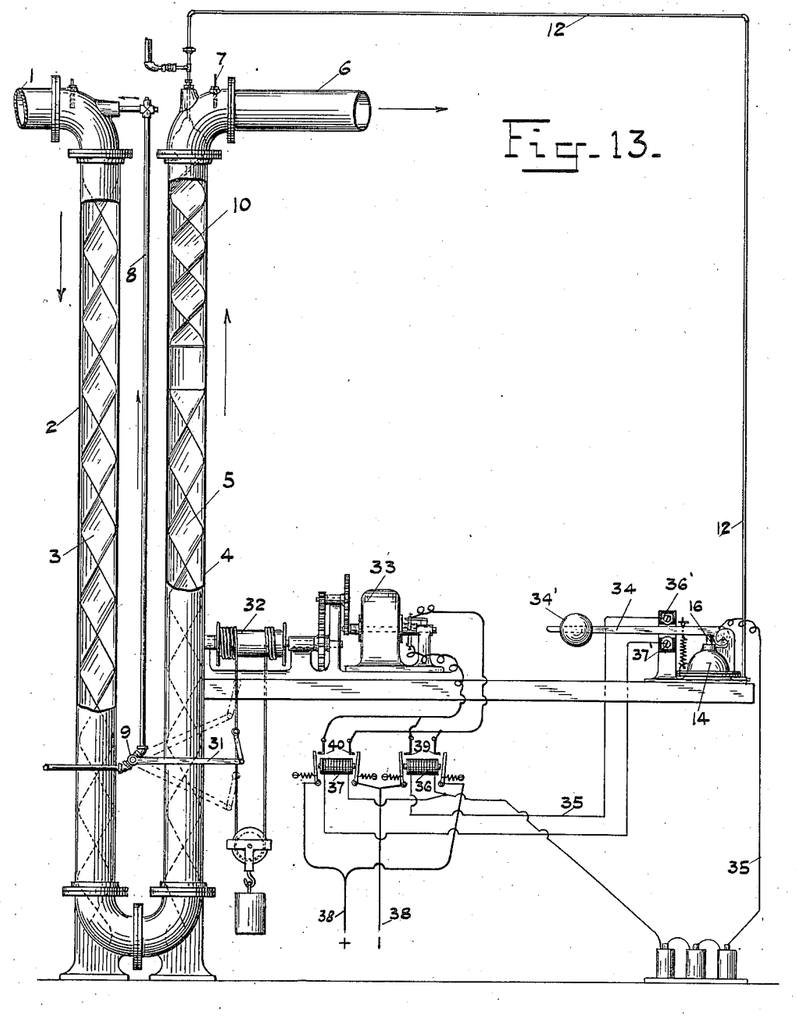

In Fig. 13 I have shown another form of apparatus for accomplishing the desired results. In this form the cock 9 is actuated by a lever 31 connected to the rope of a windlass 32, the latter being driven by an electric motor 33 in one direction to open the valve and in the opposite direction to close it according to the temperature requirements. The forms of the attemperator and of the evaporator are substantially the same as shown in Fig. 2 and after the weight 34' has been once adjusted for the desired temperature of the superheated steam such temperature is maintained by the pressure generated in the evaporator 10 acting upon the diaphragm in chamber 14 to effect a rotation of the drum of the windlass 32 in one direction or the other by the following means. The lever 34 in this case carries an adjustable weight 34' and is adapted to be raised or lowered through the movement of the stem 16 attached to the flexible diaphragm in chamber 14. This lever is included in a circuit 35, which circuit also includes the two electromagnets 36 and 37 and the contacts 36' and 37' which contacts are insulated from the rest of the apparatus. When the steam temperature exceeds the predetermined constant thereby increasing the pressure generated in the evaporator, lever 34 will be raised and close circuit 35 through contact 36' thereby energizing magnet 36 and, when its armatures are attracted, closing the motor circuit 38 through the contacts 39 to rotate the motor in such a direction as to raise lever 31 and thereby open cock 9 an amount necessary to admit the necessary volume of water to the attemperator to restore the steam temperature to the constant. On the other hand, should the temperature of the steam fall below the constant, the motor will be rotated in an opposite direction by reason of lever 34 closing circuit 35 through contact 37' thereby energizing magnet 37 to close the motor circuit through the contacts 40. The closure of cock 9 may be complete or only partial as may be necessary under the conditions of steam temperature.

An excess of superheat of a few degrees above the constant is not productive of harmful effects and, therefore, by the statement of the specification and claims that the steam temperature is set or reduced to substantially a constant figure, it is to be understood that the temperature is kept constant within a certain amount of permissible variation, and is not to be taken as absolutely constant.

In the preferred form as it has been described a volatile liquid is used in the closed vessel or evaporator 10. Instead of a volatile liquid, air or other gas, or a liquid which would not be volatile at the temperature involved could be used. However, I prefer a volatile liquid for the reason that any distortion that might change the volume of the evaporator 10, or any slight leakage in the evaporator, or in the pipes, will not affect the result obtained provided sufficient of the liquid remains in the evaporator; whereas, the result would be affected through such causes if other than a volatile liquid were used.

Figures 14, 16:
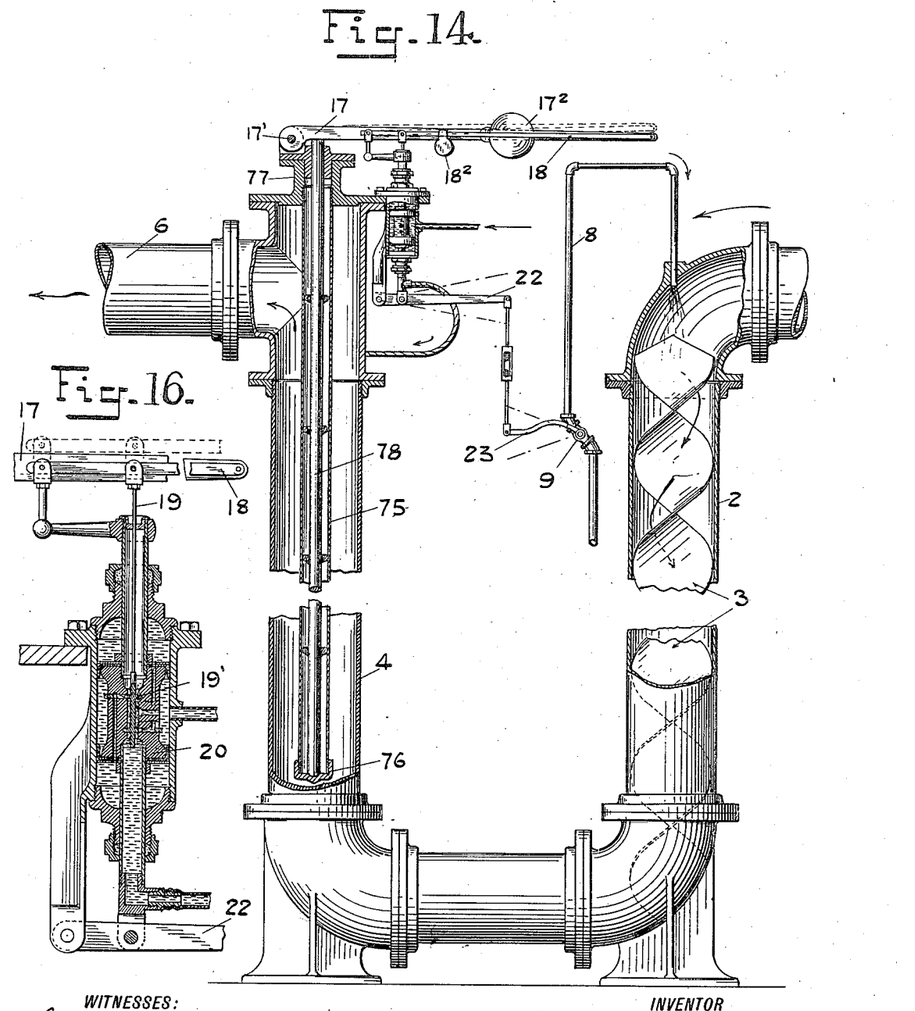
Figs. 14 and 15 are elevations, partly in section, of modifications which utilize the unequal expansion of different metals to control the temperature of the steam.
Fig. 16 is a sectional detail of Fig. 14.
Figure 15:
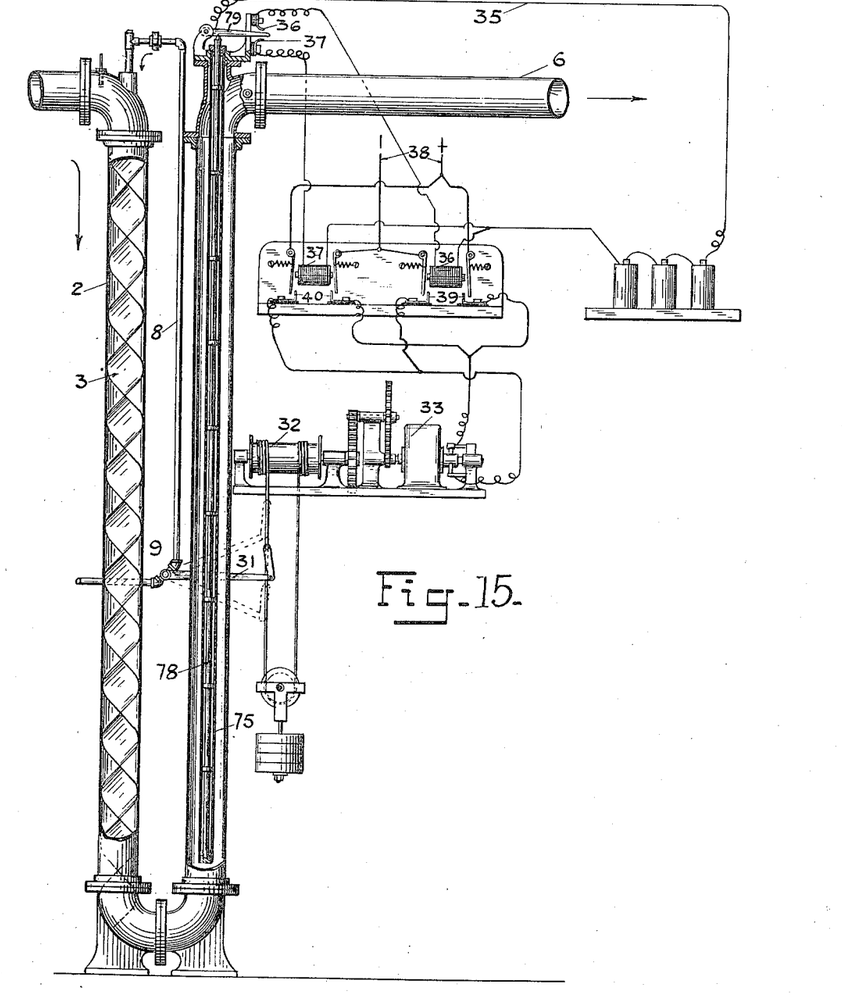

The foregoing examples of apparatus by which my method of temperature control may be practised comprise as an essential feature the closed evaporator containing a volatile liquid. In Figs. 14 and 15 I have shown the application of a thermostatic device depending upon the unequal expansion of different metals to control the position of valve or cock 9. The attemperator, and the regulator of the Carmichael or Spencer type are the same as heretofore described. Instead, however, of a closed evaporator in the pipe section 4 of the controller, I place therein a thermostat consisting of a tube 75 closed at its lower end by a cap 76 and secured at its upper end to a cap piece 77. Resting within the tube upon its cap 76 is a tube or bar 78 which projects upwardly through a suitable bushing and has its projecting end formed with a knife edge to bear against the under side of lever 17 near its fulcrum. The bar or tube 78 is preferably of iron or steel and the tube 75 of some metal having a greater coefficient of expansion than the bar or tube 78, preferably of aluminum. As will be obvious, the expansion and contraction of the tube 75 and bar 78 due to minute differences in temperature of the steam leaving the attemperator will effect a movement of lever 17, and this force will call into play a device driven by supplemental energy to control the position of the valve or cock 9 and consequently the volume of water admitted to the attemperator, in precisely the same manner as such control is effected by the pressure generated in the evaporator 10. As the tube 75 can expand only in a downward direction, and having a greater coefficient of expansion than the tube or bar 78, any excess of steam temperature above the constant will result in lowering lever 17 to open the valve or cock 9 to admit a volume of water proportionally greater than that required to maintain the normal steam temperature. If the steam temperature falls below the normal the more rapid contraction of tube 75 will raise lever 17 to decrease the volume of water admitted to the attemperator.

Fig. 16 shows substantially the same arrangement as is shown in Fig. 13 except for the substitution for the closed evaporator of the thermostat shown in Fig. 14. In such element, however, the tube 75, as before stated, has a sufficiently greater coefficient of expansion than the bar or tube 78 to impart the desired movement to lever 79 which is in the form of a contact finger adapted to close circuit 35 through either of the contacts 36—37. When the circuit 35 is closed, the corresponding magnet 36—37 will be energized to thereby close the motor circuit 38 to rotate the motor 33 in one direction or the other as fully described in connection with Fig. 13.

Any one of the thermostats described by me as available to call into play a device driven by supplemental energy to determine or control the position of the cock 9 may be replaced by a thermo-electrical element, the current generated by which could be made to call into play the same mechanism that is governed by the thermostat.

What I claim as new and desire to secure by Letters Patent of the United States is:—

1. The method of regulating the temperature of superheated steam which consists in subjecting the steam to the action of a cooling medium to reduce the temperature to a predetermined constant, and then causing any variation from that constant to effect a corresponding variation in the volume of the cooling medium to thereby restore the steam temperature to substantially that of the constant.

2. The method of regulating the temperature of superheated steam which consists in admitting a regulated quantity of water to the steam to reduce its temperature to a predetermined constant, and utilizing any variation from that constant to vary the amount of water to restore the steam temperature to substantially that of the constant.

3. The method of regulating the temperature of superheated steam which consists in subjecting superheated steam of a varying initial temperature to the action of a cooling medium to reduce the steam temperature to a predetermined constant, then passing the steam, after its temperature has been reduced, into contact with a closed evaporator containing a volatile liquid whereby any variation of the temperature of the steam will produce a corresponding variation in the temperature of the volatile liquid and the pressure of its vapor, and utilizing such vapor pressure to admit a greater or less quantity of the cooling medium to the initial steam, as the steam surrounding the evaporator varies above or below the predetermined constant.

4. The method of regulating the temperature of superheated steam which consists in admitting a regulated quantity of water to superheated steam of a varying initial temperature to reduce the steam temperature to a predetermined constant, then passing such steam into contact with a closed evaporator containing a volatile liquid whereby any variation of the temperature of the steam will produce a corresponding variation in the temperature of the volatile liquid and the pressure of its vapor, and utilizing such vapor pressure to act upon a regulator to admit a greater or less quantity of water to the steam of varying initial temperature as the steam surrounding the evaporator varies above or below the predetermined constant.

5. The method of regulating the temperature of superheated steam which consists in subjecting the steam to the action of a cooling medium to reduce the temperature to a predetermined constant, then passing the steam into contact with a thermostat and utilizing any variation from that constant to vary the amount of the cooling medium to restore the steam temperature to substantially that of the constant.

6. The method of regulating the temperature of superheated steam which consists in subjecting superheated steam of a varying initial temperature to the action of a cooling medium to reduce the steam temperature to a predetermined constant, then passing such steam into contact with a closed evaporator containing a volatile liquid whereby any variation of the temperature of the steam will produce a corresponding variation in the temperature of the volatile liquid and the pressure of its vapor, and utilizing such vapor pressure to close a circuit to thereby admit a greater or less quantity of the cooling medium to the initial steam as the steam surrounding the evaporator varies above or below the predetermined constant.

7. The method of regulating the temperature of superheated steam which consists in subjecting the steam to the action of a cooling medium to reduce the temperature to a predetermined constant, and then causing any variation from that constant to act upon and control a source of supplemental energy to effect a corresponding variation in the volume of the cooling medium to thereby restore the steam temperature to substantially that of the constant.

8. The method of regulating the temperature of superheated steam which consists in admitting a regulated quantity of a cooling medium to reduce the steam temperature to a predetermined constant, then passing the steam after its temperature has been reduced into contact with a thermostat whereby any variation of the temperature of the steam will correspondingly act upon the thermostat, and utilizing the movements of the thermostat to control a source of supplemental energy to thereby admit a greater or less quantity of the cooling medium to the initial steam as the steam surrounding the thermostat varies above or below the predetermined constant.

9. The method of regulating the temperature of superheated steam which consists in subjecting superheated steam of a varying initial temperature to the action of a cooling medium to reduce the steam temperature to a predetermined constant, then passing the steam after its temperature has been reduced into contact with a closed evaporator containing a volatile liquid whereby any variation of the temperature of the steam will produce a corresponding variation in the temperature of the volatile liquid and the pressure of its vapor, and utilizing such vapor pressure to control a source of supplemental energy which acts to admit a greater or less quantity of the cooling medium to the initial steam as the steam surrounding the evaporator varies above or below the predetermined constant.

10. In combination, an attemperator to which steam of a varying initial temperature is admitted, means for admitting a cooling medium to the attemperator to reduce the temperature of the steam to a predetermined constant, a thermostat and means for conducting the steam, after its temperature has been modified, into contact with said thermostat, and means controlled by said thermostat to effect a corresponding variation in the volume of the cooling medium to thereby restore the steam temperature to substantially that of the constant.

11. In combination, an attemperator to which steam of a varying initial temperature is admitted, means for admitting a cooling medium to the attemperator to reduce the temperature of the steam to a predetermined constant, a thermostat and means for conducting the steam, after its temperature has been modified, into contact with said thermostat, mechanism to govern the supply of said medium comprising a source of supplemental energy and means controlling said source of energy operated by said thermostat to effect a corresponding variation in the volume of the cooling medium to thereby restore the steam temperature to substantially that of the constant.

12. In combination, an attemperator to which steam of a varying initial temperature is admitted, means for admitting a cooling medium to the attemperator to reduce the temperature of the steam to a predetermined constant, a closed evaporator containing a volatile liquid placed in the path of the steam after it leaves the attemperator, mechanism to govern the supply of said medium comprising a source of supplemental energy, and means controlling said source of energy operated by the slight differences of pressure which are produced in the evaporator by the temperature variations in the steam surrounding the evaporator to effect a corresponding variation in the volume of the cooling medium to thereby restore the steam temperature to substantially that of the constant.

In testimony whereof I have hereunto signed my name in the presence of two subscribing witnesses.

DAVID S. JACOBUS.

Witnesses:
 CHARLES S. JONES,
 LOUIS J. BERNSTEIN.